US005583681A

United States Patent [19]
Shioya et al.

[11] Patent Number: 5,583,681
[45] Date of Patent: Dec. 10, 1996

[54] LIQUID CRYSTAL APPARATUS AND INFORMATION TRANSMISSION APPARATUS

[75] Inventors: Yasushi Shioya, Atsugi; Hisao Tajima, Yokohama; Hiroshi Takabayashi, Kawasaki; Toshiaki Itazawa, Yamato; Masanori Takahashi; Kenji Niibori, both of Chigasaki, all of Japan

[73] Assignee: Canon Kabushiki Kaisha, Tokyo, Japan

[21] Appl. No.: 150,987

[22] Filed: Nov. 12, 1993

[30]  Foreign Application Priority Data

Nov. 12, 1992 [JP] Japan .................................. 4-327467
Nov. 12, 1992 [JP] Japan .................................. 4-327468

[51] Int. Cl.⁶ .............................................. G02F 1/1333
[52] U.S. Cl. .............................................. 349/60; 349/161
[58] Field of Search .............................. 359/83, 48, 49, 359/50

[56]     References Cited

U.S. PATENT DOCUMENTS

| | | | |
|---|---|---|---|
| 4,964,700 | 10/1990 | Takabayashi | 359/88 |
| 5,119,204 | 6/1992 | Hashimoto et al. | 358/254 |
| 5,150,231 | 9/1992 | Iwamoto et al. | 359/44 |
| 5,170,194 | 12/1992 | Kurematsu et al. | 359/70 |
| 5,270,848 | 12/1993 | Takabayashi et al. | 359/88 |
| 5,283,674 | 2/1994 | Hanaoka et al. | 359/49 |
| 5,299,038 | 3/1994 | Hamada et al. | 359/49 |

FOREIGN PATENT DOCUMENTS

| | | |
|---|---|---|
| 0375425 | 6/1990 | European Pat. Off. . |
| 0455886 | 11/1991 | European Pat. Off. . |
| 9015359 | 12/1990 | WIPO . |

OTHER PUBLICATIONS

Danial et al., "LCD Air Cushion", Motorola Technical Developments, vol. 12, Schaumburg, Illinois, US, Apr. 1991, pp. 170–171.

*Primary Examiner*—Anita Pellman Gross
*Assistant Examiner*—Ron Trice
*Attorney, Agent, or Firm*—Fitzpatrick, Cella, Harper & Scinto

[57]      ABSTRACT

A liquid crystal apparatus includes: a liquid crystal panel, an illumination means for illuminating the liquid crystal panel, a supporting means for supporting the liquid crystal panel and a housing for housing the above members. The liquid crystal panel and the supporting means are arranged so as to define an almost closed space functioning as an air damper to suppress deformation caused by an externally applied force owing to elasticity of air within the almost closed space. The supporting means includes a unit-supporting portion for supporting the illumination means, the unit-supporting portion being provided with a cutout at a part thereof for promoting discharge of heat evolved from the illumination means, and, the illumination means is supported by the unit-supporting portion so as to stop up the cutout of the unit-supporting portion, thus retaining the almost closed space. The liquid crystal apparatus is further provided with means for enhancing discharge of heat evolved by the illumination means out of the apparatus from a side opposite to the liquid crystal panel of the illumination means.

9 Claims, 9 Drawing Sheets 5,583,681

LIQUID CRYSTAL APPARATUS AND INFORMATION TRANSMISSION APPARATUS

FIELD OF THE INVENTION AND RELATED ART

The present invention relates to a liquid crystal apparatus for displaying images having an improved liquid crystal panel-supporting structure and an information transmission apparatus including such a liquid crystal apparatus.

Hitherto, there has been encountered a problem that a liquid crystal panel secured to a liquid crystal apparatus is supplied with a load to be distorted and deteriorate alignment of the liquid crystal or an impact or vibration applied to the liquid crystal apparatus is transmitted to the liquid crystal panel, thus deteriorating the alignment of the liquid crystal and image quality. Particularly, a ferroelectric liquid crystal is liable to cause the above problem, and a panel-supporting system as described below has been adopted (U.S. Pat. No. 5,150,231).

As shown in FIG. 8, a panel-fixing plate 84 having an opening is provided, and an adhesive 85 is applied to a part close to and surrounding the opening of the plate 84, to which a liquid crystal panel 81 is supported with an adhesive 85. Further, a peripheral circuit (drive IC) plate 83 as a drive means is secured to the panel-supporting plate 84, and a printed wire film 82 ("TAB") is connected thereto. Then, the panel-fixing plate 84 is supported in a hung state at an opening of a fixing plate-supporting member 87 with an elastic or elastomeric member 86, whereby an almost closed space 830 is defined therebelow. Above the panel-supporting plate, another almost closed space is defined and is filled with a rubbery adhesive such as a silicone rubber-based one, followed by curing thereof. A backlight 88 is disposed below (I.e., on the back of) of the liquid crystal panel 81 so as to define an almost closed space 830.

The almost closed spaces are formed below and above the liquid crystal panel 81 for the following reason. Referring to FIG. 8 showing an almost closed space 830 below the liquid crystal panel 81, when an impact is applied to the liquid crystal apparatus as by dropping, etc., the panel-fixing plate 84 supported by the elastic member 86 is moved in the direction of ±Z. At this time, as the almost closed space 830 is disposed below the liquid crystal panel 81, air within the almost closed space 830 does not readily move outside the space 830 but is compressed. As a counter force to the compression, an air damper effect is attained so that the impact applied to the liquid crystal panel is relaxed. As a result, deformation of the liquid crystal panel 81 is suppressed, thereby obviating the deterioration of alignment and image quality.

An liquid crystal apparatus having a panel-supporting structure as described above has been found to involve problems as described below.

(1) A sufficient time is required for curing of the elastic member between the panel fixing plate 84 and the fixing plate-supporting member 87. Accordingly, the liquid crystal panel 81, the printed circuit film 82 and the peripheral circuit plate 83 have to be held on the panel-fixing plate 84 for a long time, during which these members have to be managed so as not to be damaged, thus requiring a troublesome process management.

(2) In case where an impact is applied to the liquid crystal apparatus in the ±Z direction as shown in FIG. 9, the liquid crystal panel 81 is also moved in the ±Z direction and the elastic member 86 is subjected to tension as show. At this time, as the liquid crystal panel 81, the liquid crystal panel-fixing plate 84 and the elastic member 86 are disposed in a substantially identical plane, these members are deformed in an arcuate form. As a result, the printed circuit film 82 is supplied with a stress to cause breakage or connection failure between the printed circuit film 82 and the peripheral circuit plate 83 and/or between the printed circuit film 82 and the liquid crystal panel 81.

(3) Further, in case where the rigidity of the members (the panel fixing plate 84 and the fixing plate-supporting member 87) is insufficient, these members can be deformed (as indicated by arrows in FIG. 9) in advance due to a counterforce of compressed air within the almost closed space 830 caused by deformation of the liquid crystal panel 81 and the panel fixing plate 84, so that a sufficient air damper effect cannot be attained in some cases.

(4) Further, heat evolved by the illumination means (backlight 88) in the liquid crystal apparatus is accumulated within the almost closed space 830, so that the liquid crystal panel can be accompanied with a temperature increase and/or an ununiform temperature distribution of the liquid crystal panel, thus giving a factor of causing an operation temperature margin of the liquid crystal apparatus.

SUMMARY OF THE INVENTION

An object of the present invention is to provide a liquid crystal apparatus having solved the above-mentioned problems.

According to the present invention, there is provided a liquid crystal apparatus, comprising: a liquid crystal panel, an illumination means for illuminating the liquid crystal panel, a supporting means for supporting the liquid crystal panel and a housing for housing the liquid crystal panel, the illumination means and the supporting means, the liquid crystal panel and the supporting means being arranged so as to define an almost closed space functioning as an air damper to suppress deformation caused by an externally applied force owing to elasticity of air within the almost closed space, wherein said supporting means includes a unit-supporting portion for supporting the illumination means, the unit-supporting portion being provided with a cutout at a part thereof; the illumination means is supported by the unit-supporting portion so as to stop up the cutout of the unit-supporting portion, thus retaining the almost closed space; and the liquid crystal apparatus is further provided with means for enhancing discharge of heat evolved by the illumination means out of the apparatus from a side opposite to the liquid crystal panel of the illumination means.

In order to enhance the heat discharge, it is possible to provide air passage perforations and/or heat-discharge fins. According to the liquid crystal apparatus of the present invention as described above, externally applied impact or vibration is effectively absorbed by the air damper effect while suppressing a temperature elevation of the liquid crystal panel due to accelerated discharge of heat evolved by the illumination means.

According to another aspect of the present invention, there is provided a liquid crystal apparatus, comprising: a liquid crystal panel, an illumination means for illuminating the liquid crystal panel, a supporting means for supporting the liquid crystal panel and a housing for housing the liquid crystal panel, the illumination means and the supporting means, the liquid crystal panel and the supporting means being arranged so as to define an almost closed space functioning as an air damper to suppress deformation caused by an externally applied force owing to elasticity of air within the almost closed space, wherein said supporting means is divided into a first member and a second member separatable from each other, said first member supporting the liquid crystal panel and drive means for the liquid crystal panel, and said second member being engageable with the first member to aid the securing of the supporting means to the housing.

According to a further aspect of the present invention, there is provided an information transmission apparatus, including:

a graphic controller for supplying data signals and a scanning scheme signal, a scanning signal control circuit for supplying scanning line address data and a scanning scheme signal, a data signal control circuit for supplying display data and a scanning scheme signal, and a liquid crystal apparatus as described above.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

[First Embodiment]

Figure 1:
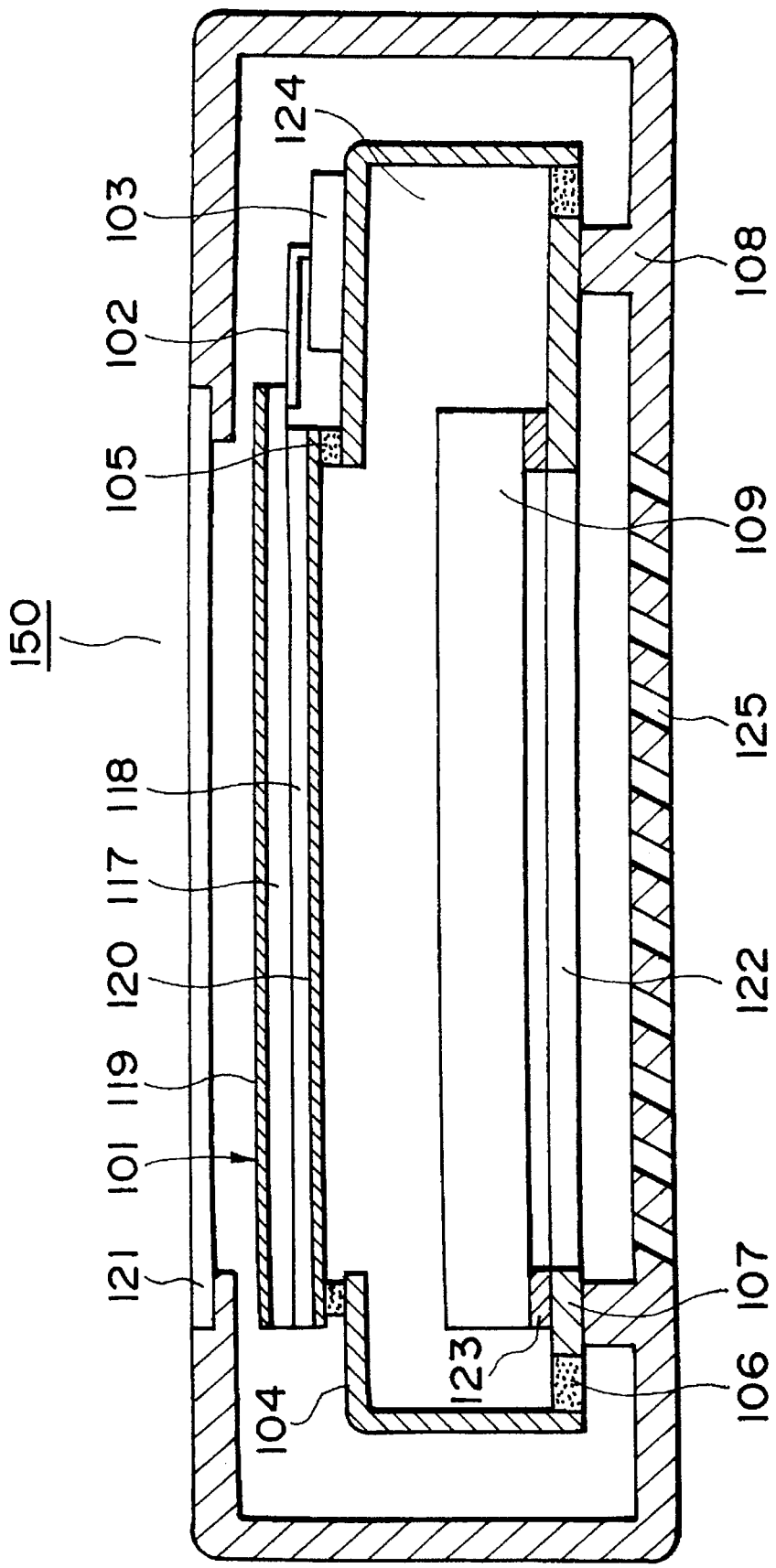
FIGS. 1 and 2 are sectional views of an embodiment of the liquid crystal apparatus according to the present invention showing a basic structure and an operation state including a state of heat discharge through air passage perforations, respectively.

FIG. 1 is a sectional view of an liquid crystal apparatus according to the present invention. The liquid crystal apparatus 150 includes a housing 108, a liquid crystal panel 101 and a side light (or backlight) unit 109. The liquid crystal panel 101 includes a pair of oppositely disposed glass plates 117 and 118 between which a liquid crystal, such as a ferroelectric liquid crystal, is disposed. Outside the glass plates 117 and 118, polarizer films 119 and 120 are respectively disposed. The liquid crystal panel 101 and the side light unit 109 are disposed within the housing 108. The liquid crystal panel 101 is affixed to a panel-fixing plate (or frame) 104 with a rubber-type adhesive. A protective plate 121 is disposed over the entire area of the liquid crystal panel 101 so as to prevent an external force from directly acting on the liquid crystal panel 101.

The panel-fixing frame 104 is affixed to a fixing frame-supporting member 107 with an elastic or elastomeric member 106 of, e.g., silicone rubber, so that the panel-fixing frame 104 is hung in suspension with respect to the fixing frame-supporting member 107 and an almost closed space 124 is formed. Further, the side light unit 109 as an illumination means is disposed on the fixing frame-supporting member 107, and apart below the side light unit 109 of the fixing frame-supporting member 107 is cut out to form an opening window (or cutout 122).

In a structure constituted in the above-described manner, the space 124 defined by the liquid crystal panel 101, the panel-fixing frame 104, the fixing frame-supporting member 107 and the side light unit 109 is formed as an almost closed one.

Next, a manner assembling the liquid crystal apparatus having the above-described structure will be described. First, the liquid crystal panel 101 and the peripheral circuit (drive IC) substrate 103 are secured to the panel-fixing frame 104 by an adhesive 105 and screws (not shown), respectively. Separately, the side light unit 109 is affixed to the fixing frame-supporting member 107 with a gasket 123 sandwiched therebetween. Finally, an adhesive 106 is packed and cured for adhesion between the panel fixing frame 104 and an end surface of the fixing frame-supporting member 107.

Figure 2:
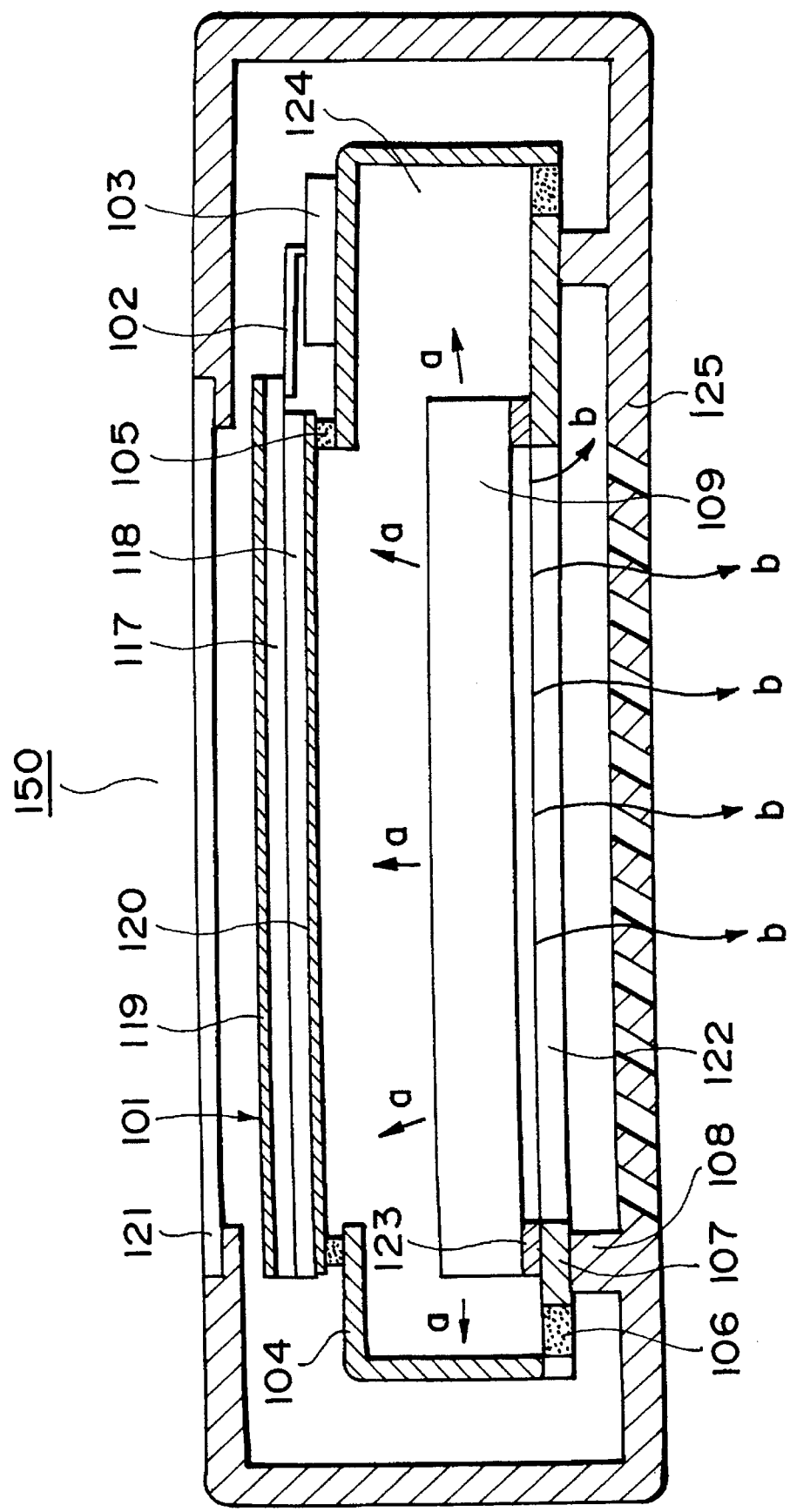

According to the above-described structure, heat generated by turning on the side light unit 109 is discharged not only through the surface of the unit housing 108 and the transparent protective plate 121 in the direction of arrows a but also through the opening 122 and air passage perforations 125 provided in the housing 108 in the direction of arrows b (shown in FIG. 2). Accordingly, in comparison with a case where the opening 122 is not provided, a less quantity of heat is evolved into the almost closed space, and the side light unit 109 can be cooled by communication with the ambience through the air passage perforations 125, so that less heat is accumulated within the apparatus. Further, as the almost closed space 124 is retained within the apparatus, a sufficient air damper effect is attained in response to an external force such as an impact. As a result, even a liquid crystal apparatus using a ferroelectric liquid crystal can not only retain a high impact durability but also retain a large drive temperature margin, thus ensuring a high reliability.

Further, it has become possible to obviate the problem of breakage of the TAB film 102 due to peeling of the adhesive 105 between the liquid crystal panel 101 and the supporting member 104 when an external impact is applied in a direction perpendicular to the liquid crystal panel.

Figure 7:
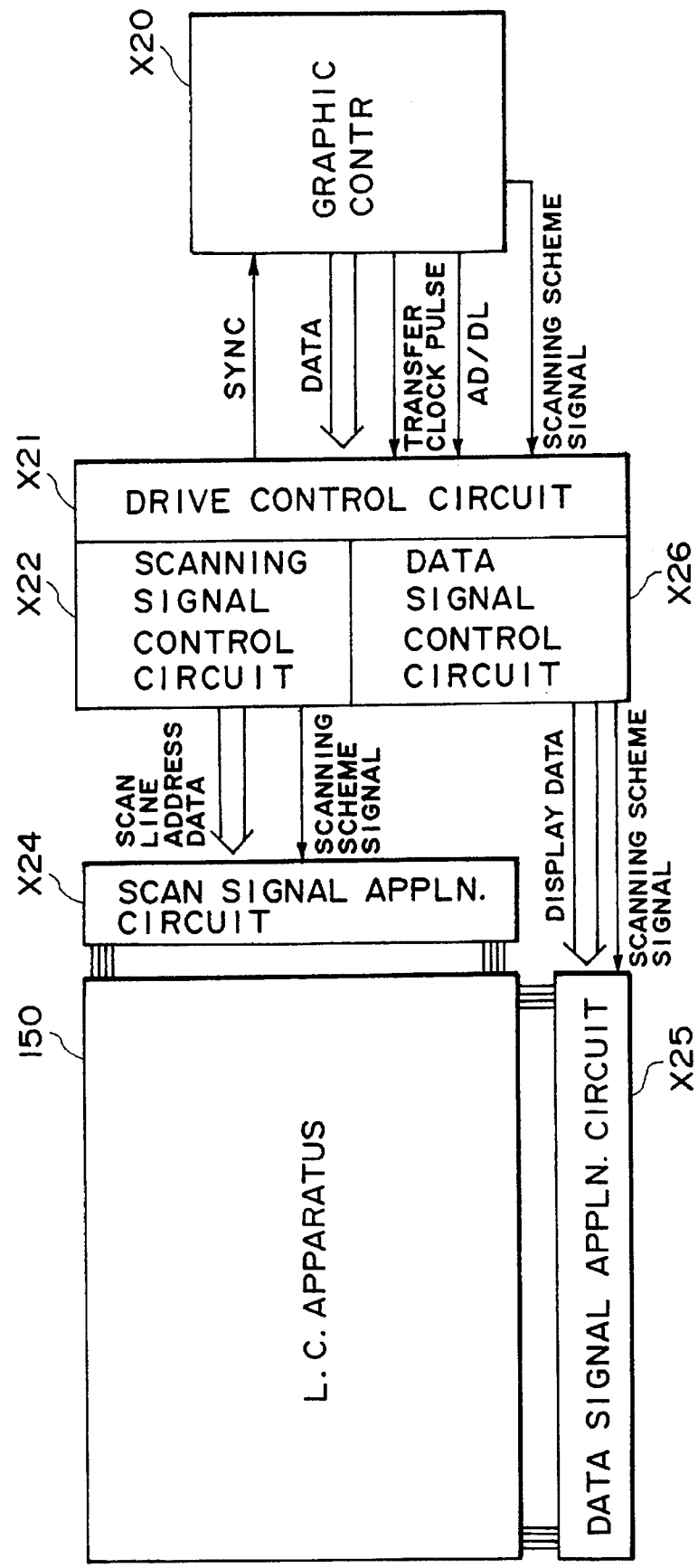
FIG. 7 is a block diagram of an information transmission apparatus according to the present invention.
Figure 8:
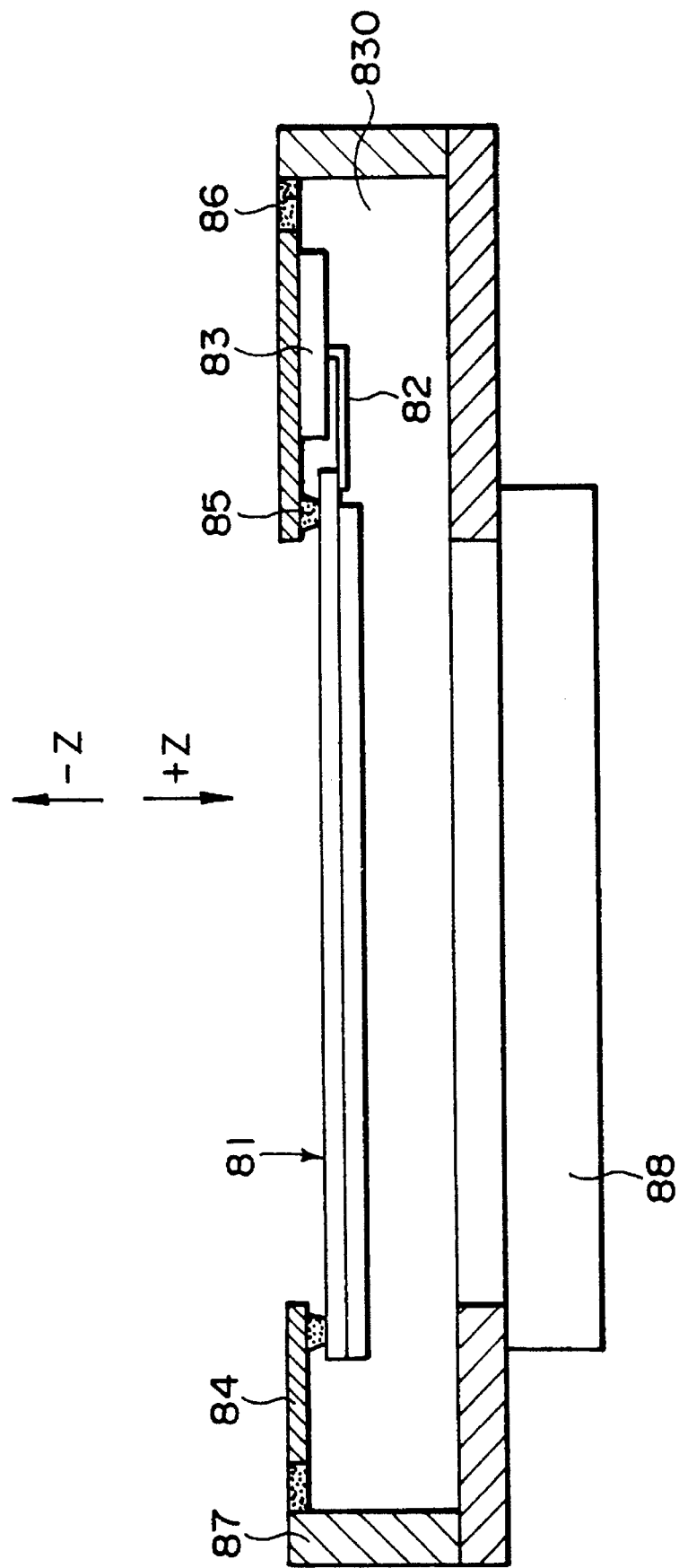
FIGS. 8 and 9 are sectional views of a liquid crystal apparatus of the prior art showing a state thereof when supplied with an external impact.
Figure 9:
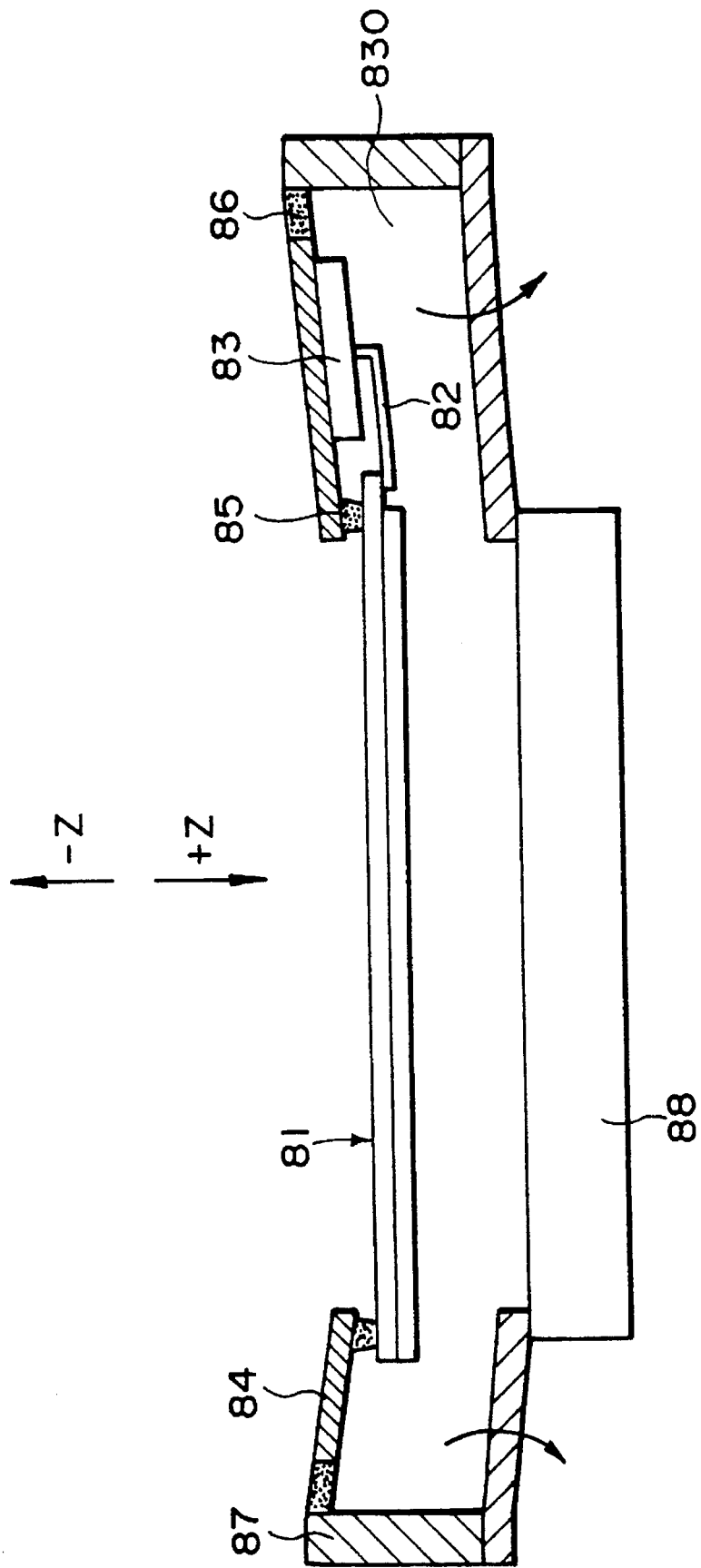

Such a liquid crystal apparatus 150 may be included in an information transmission apparatus as shown in FIG. 7.

Referring to FIG. 7, the information transmission apparatus includes a graphic controller X20, a drive control circuit X21, a scanning signal control circuit, a data signal control circuit X23, a scanning signal applying circuit X24 and a data signal applying circuit X25, and a liquid crystal apparatus 150.

Scanning scheme signals and data issued from the graphic controller X20 are outputted to the scanning signal control circuit X22 and the data signal control circuit X23 by the drive control circuit X21. In this instance, the data are converted into address data and display data, and the scanning scheme signals are applied as they are to the scanning signal application circuit X24 and the data signal application circuit X25. The scanning signal application circuit X24 outputs a scanning signal waveform determined by the scanning scheme signals to a scanning electrode (not shown) determined by the address data. The data signal application circuit X25 outputs a data signal waveform determined by the scanning scheme signals and a display signal for displaying a "white" or "black" state based on display data to data electrodes (not shown). As a result, prescribed information is displayed on the liquid crystal apparatus 150.

In the information transmission apparatus described above, the formerly described liquid crystal apparatus according to the present invention is included, so that it is possible to provide an information transmission apparatus which is free from performance change in a long time use and is reliable.

[Second Embodiment]

Figure 3:
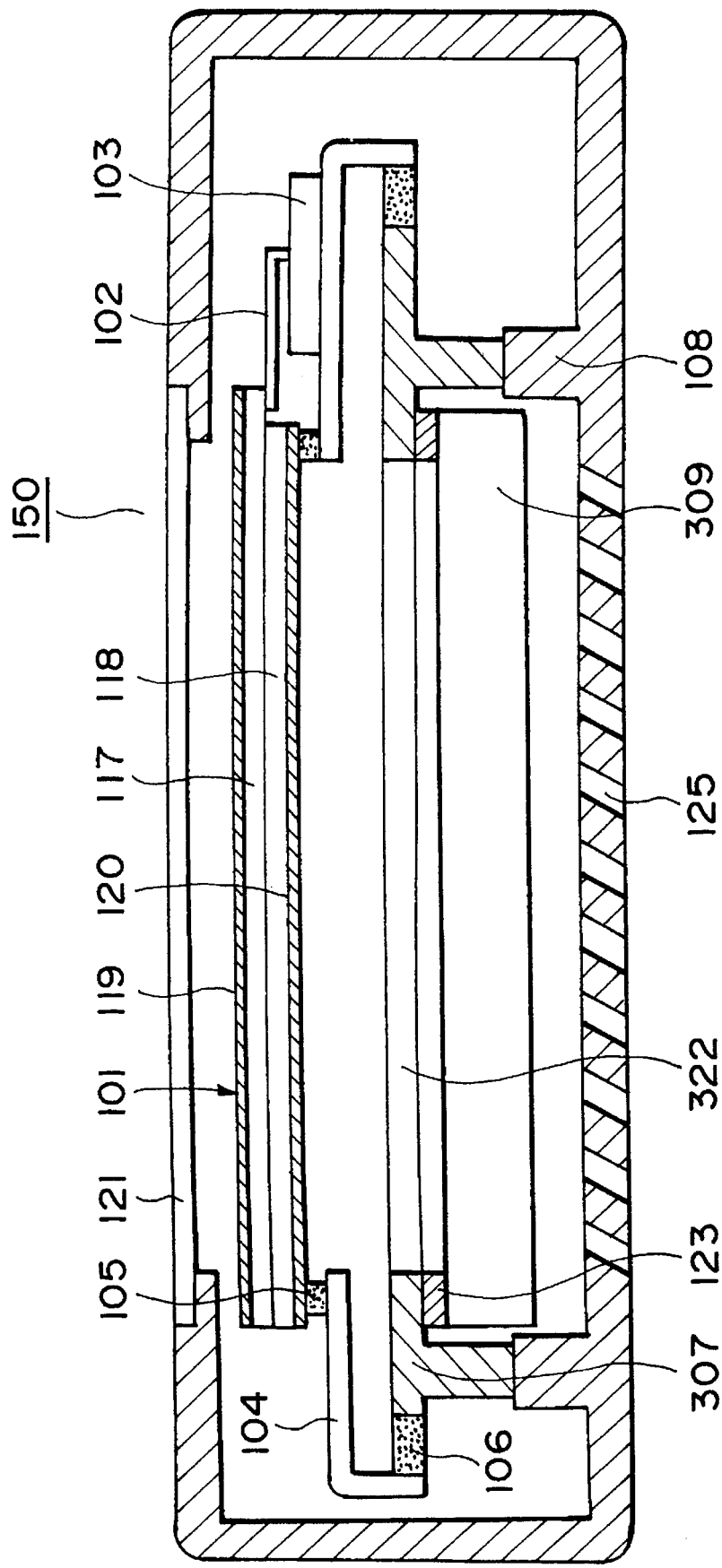
FIGS. 3–6 are respectively a sectional view of another embodiment of the liquid crystal apparatus according to the present invention.
Figure 4:
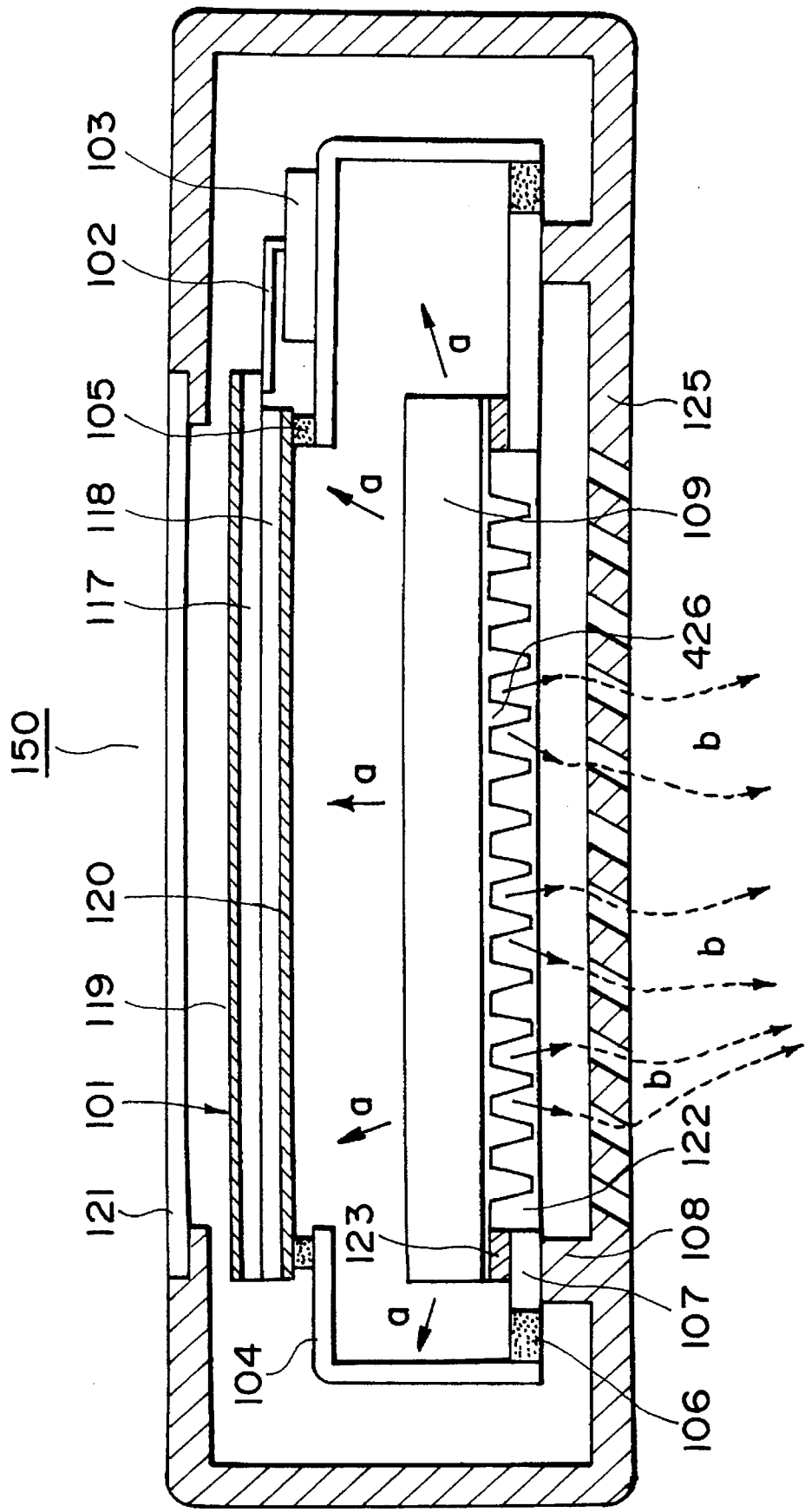

This embodiment of the liquid crystal apparatus shown in FIG. 3 is different from the first embodiment shown in FIG. 1 only with respect to an arrangement of a fixing frame supporting member 307 and the side light unit 309.

More specifically, in this embodiment, the side light unit 109 is supported and affixed to a lower side of the fixing frame-supporting member 307, and the opening 322 of the fixing frame-supporting member 307 is stopped up with the side light unit 309 as an illumination means.

As a result, the distance between the illumination means 309 and the opening or air passage perforations 125 is decreased, so that the efficiency of heat discharge is improved.

The liquid crystal apparatus may also be included as a liquid crystal apparatus 150 in an information transmission apparatus as shown in FIG. 7.

[Third Embodiment]

This embodiment of the liquid crystal apparatus includes heat-discharge fins 426 provided to the housing of the side-light unit 309 for enhancing the heat-discharge effect in addition to an opening 122 for heat discharge as used in the first and second embodiments.

The liquid crystal apparatus may also be included as a liquid crystal apparatus 150 in an information transmission apparatus as shown in FIG. 7.

[Fourth Embodiment]

Figure 5:
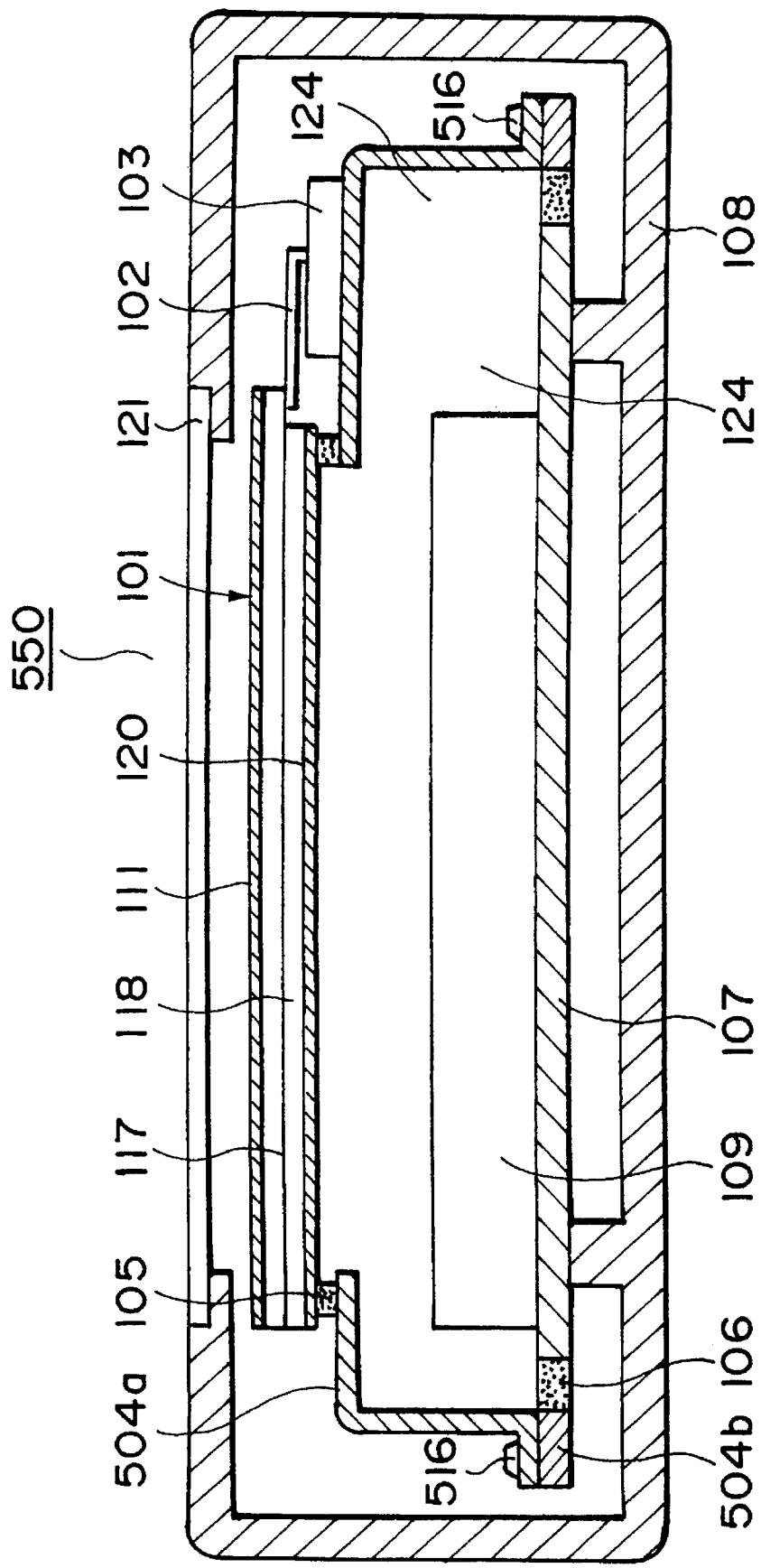

FIG. 5 shows a fourth embodiment of the liquid crystal apparatus 550 according to the present invention, which is identical to the first embodiment in that a liquid crystal panel 101 and a side light unit 109 are disposed within an apparatus housing 108. In this embodiment, the panel supporting means (14 in FIG. 1) is divided into a first member 504a carrying thereon the liquid crystal panel 101 and drive means 102 and 103 therefor and a second member 504b. The members 504a and 504b are secured to each other by screws 516. As a result, the liquid crystal panel 101 need not be held together for a long time for curing of the adhesive 108, so that the liquid crystal panel is not deteriorated thereby and the entire process can be simplified.

This embodiment of the liquid crystal apparatus 550 may also be included as a liquid crystal apparatus 150 in an information transmission apparatus as shown in FIG. 7.

[Fifth Embodiment]

Figure 6:
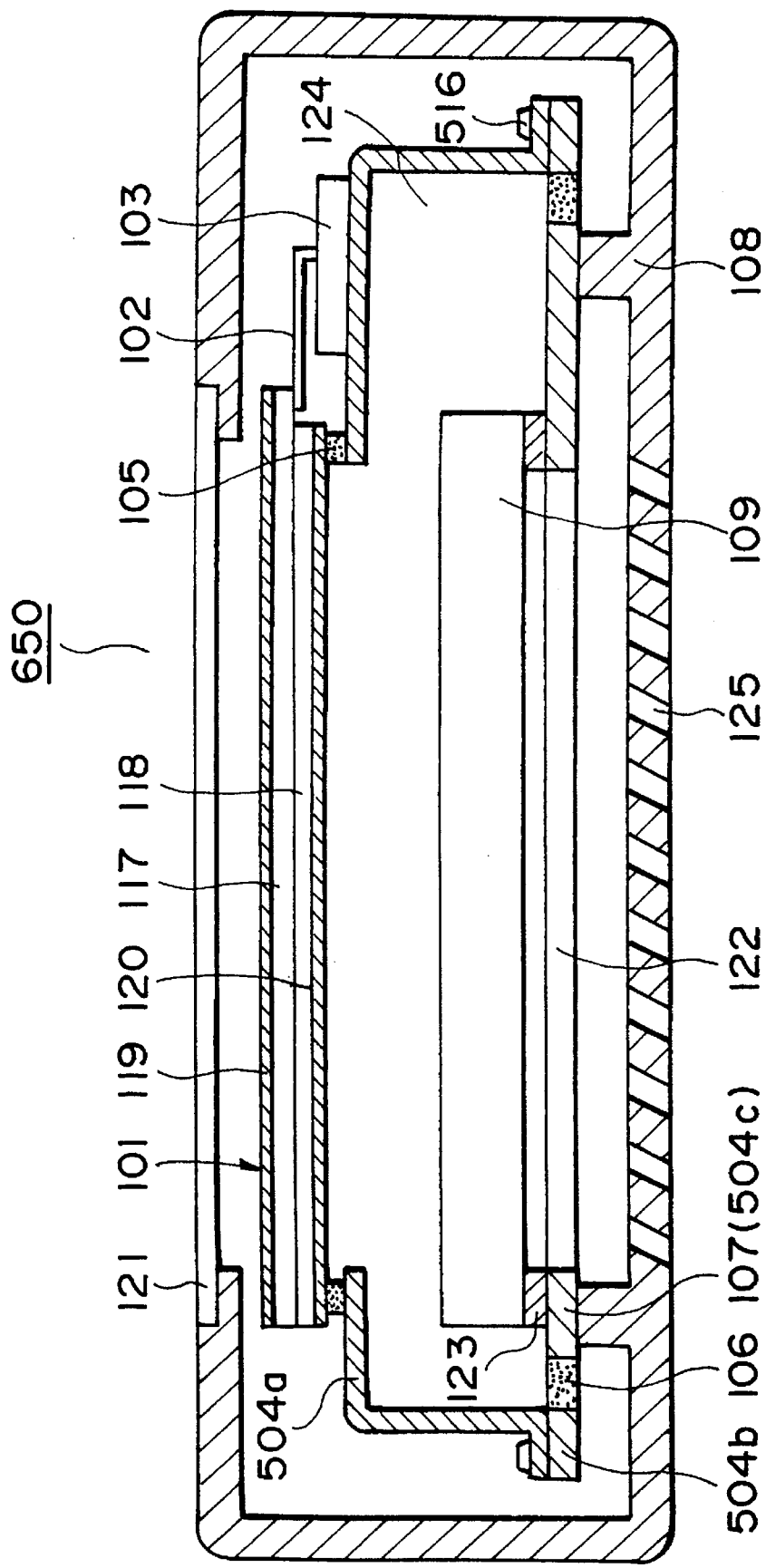

This embodiment is provided with the characteristics of the above first and fourth embodiments in combination and illustrated in FIG. 6. In comparison with FIG. 5, this embodiment 650 shown in FIG. 6 is characterized in that a part (member) 107 (504c) of the panel-supporting means connected via the adhesive 106 with the member 504b and supporting the side light 109 is provided with a cutout 122 to be stopped up with the side light 109 and a part close to the side light unit 109 of the housing is provided with air passage perforations 125.

According to this embodiment, the panel 101 as well as the drive means 102 and 103 therefor is provided with an improved impact resistance while ensuring a sufficient heat-discharge performance and the simplicity of the entire fabrication process.

This embodiment of the liquid crystal apparatus 650 may also be included as a liquid crystal apparatus 150 in an information transmission apparatus as shown in FIG. 7.

What is claimed is:

1. A liquid crystal apparatus, comprising: a liquid crystal panel, an illumination means for illuminating the liquid crystal panel, a supporting means for supporting the liquid crystal panel and a housing for housing the liquid crystal panel, the illumination means and the supporting means, the liquid crystal panel and the supporting means being arranged so as to define an almost closed space functioning as an air damper to suppress deformation caused by an externally applied force owing to elasticity of air within the almost closed space, wherein said supporting means is divided into first member and a second member separatable from each other, said first member supporting the liquid crystal panel and drive means for the liquid crystal panel, and said second member being engageable with the first member to aid the securing of the supporting means to the housing, and wherein said second member is connected to a third member supporting the illumination means and secured to the housing via an elastic adhesive.

2. A liquid crystal apparatus, comprising: a liquid crystal panel, an illumination means for illuminating the liquid crystal panel, a supporting means for supporting the liquid crystal panel and a housing for housing the liquid crystal panel, the illumination means and the supporting means, the liquid crystal panel and the supporting means being arranged so as to define an almost closed space functioning as an air damper to suppress deformation caused by an externally applied force owing to elasticity of air within the almost closed space, wherein said supporting means is divided into a first member and a second member separatable from each other, said first member supporting the liquid crystal panel and drive means for the liquid crystal panel, and said second member being engageable with the first member to aid the securing of the supporting means to the housing, wherein said second member is connected to a third member supporting the illumination means and secured to the housing via an elastic adhesive, and wherein said third member is provided with a cutout at a part thereof and the illumination means is supported by the third member so as to stop up the cutout of the third member, thus retaining the almost closed space, the liquid crystal apparatus being further provided with means for enhancing discharge of heat evolved by the illumination means out of the apparatus from a side opposite to the liquid crystal panel of the illumination means.

3. An information transmission apparatus, including:

a graphic controller for supplying data signals and a scanning scheme signal, a scanning signal control circuit for supplying scanning line address data and a scanning scheme signal, a data signal control circuit for supplying display data and a scanning scheme signal, and a liquid crystal apparatus according to claim 1 or 2.

4. A liquid crystal display apparatus, comprising:

a) a liquid crystal panel;

b) a panel-fixing member for supporting the liquid crystal panel;

c) a light source disposed behind the liquid crystal panel;

d) a supporting member supporting the light source and having an opening on a back side or a front side of the light source;

e) a housing accommodating therein the liquid crystal panel, the panel-fixing member, the light source and the supporting member;

f) an elastic member bonding the panel-fixing member and the supporting member, so as to form an almost closed space surrounded by the liquid crystal panel, the panel-fixing member and the light source; and g) a plurality of perforations provided in the housing on a back side of the light source at a part corresponding to said opening of the supporting member.

5. A liquid crystal display apparatus according to claim 4, wherein heat discharge fins are disposed on a back side of the light source so as to face the part of the housing provided with the perforations.

6. A liquid crystal display apparatus, comprising:

a) a liquid crystal panel;

b) a panel-fixing member for supporting the liquid crystal panel;

c) an elastic member bonding the panel-fixing member to a support member movable relative to the support member, said panel-fixing member being composed of a first member connected the liquid crystal panel and second member bonded to the support member via the elastic member, said first member and second member being separably assembled to form said panel-fixing member.

7. A liquid crystal display apparatus according to claim 6, wherein said first member has a bent portion on which a drive IC is mounted.

8. A liquid crystal display apparatus according to claim 6, wherein said support member includes a portion carrying a light source and a housing for accommodating the liquid crystal panel, the panel-fixing member and the light source.

9. A liquid crystal display apparatus according to claim 6, wherein a drive IC is mounted on said first member and is connected to the liquid crystal panel via a TAB-film.

* * * * *

UNITED STATES PATENT AND TRADEMARK OFFICE
CERTIFICATE OF CORRECTION

PATENT NO. : 5,583,681

DATED : December 10, 1996

INVENTOR(S) : YASUSHI SHIOYA, ET AL.

It is certified that error appears in the above-identified patent and that said Letters Patent is hereby corrected as shown below:

COLUMN 1

Line 53, "An" should read --A--.

COLUMN 3

Line 50, "an" should read --a--.

COLUMN 8

Line 7, "the" should read --to the--.

Signed and Sealed this

Twenty-seventh Day of May, 1997

Attest:

BRUCE LEHMAN

Attesting Officer

Commissioner of Patents and Trademarks